United States Patent
Reeb et al.

(10) Patent No.: US 11,512,735 B2
(45) Date of Patent: Nov. 29, 2022

(54) METHOD AND DEVICE FOR POST-PROCESSING A CRANKSHAFT

(71) Applicant: MASCHINENFABRIK ALFING KESSLER GMBH, Aalen (DE)

(72) Inventors: Alfons Reeb, Aalen (DE); Jochen Schmidt, Boebingen a.d. Rems (DE); Konrad Grimm, Aalen (DE)

(73) Assignee: MASCHINENFABRIK ALFING KESSLER GMBH

( * ) Notice: Subject to any disclaimer, the term of this patent is extended or adjusted under 35 U.S.C. 154(b) by 416 days.

(21) Appl. No.: 16/622,701

(22) PCT Filed: May 24, 2018

(86) PCT No.: PCT/EP2018/063692
§ 371 (c)(1),
(2) Date: Dec. 13, 2019

(87) PCT Pub. No.: WO2018/228793
PCT Pub. Date: Dec. 20, 2018

(65) Prior Publication Data
US 2020/0116194 A1 Apr. 16, 2020

(30) Foreign Application Priority Data
Jun. 14, 2017 (DE) .......................... 102017113071.3

(51) Int. Cl.
*B21D 3/16* (2006.01)
*F16C 3/06* (2006.01)
(Continued)

(52) U.S. Cl.
CPC ............... *F16C 3/06* (2013.01); *B24B 39/04* (2013.01); *B23P 9/02* (2013.01); *B23P 9/04* (2013.01);
(Continued)

(58) Field of Classification Search
CPC ........ F16C 3/06; F16C 2360/22; B24B 39/04; B23P 9/02; B23P 9/04; B23P 2700/07; C21D 7/04; C21D 9/30
See application file for complete search history.

(56) References Cited

U.S. PATENT DOCUMENTS 4,416,130 A * 11/1983 Judge, Jr. .................. B23P 9/04
                                                                 72/76
4,682,489 A    7/1987 Bauerle et al.
(Continued)

FOREIGN PATENT DOCUMENTS

DE         3438742 C2    3/1988
DE      102005032185    1/2007
(Continued)

*Primary Examiner* — Jun S Yoo
(74) *Attorney, Agent, or Firm* — Harvey S. Kauget; Burr & Forman LLP

(57) ABSTRACT

The invention relates to a method for post-processing a crankshaft (4), in particular in order to correct concentricity errors and/or for a length correction. Sectors (S1,S2,S3,S4, S5,S6) of the crankshaft (4) which produce and/or characterize concentricity errors are detected and/or a length deviation (ΔL1 ΔL2, ΔL3) from a target length (L1,L2, L3) is determined for at least one section of the crankshaft (4). An impact force (Fs) is then introduced into at least one defined transition radius (8) between connecting rod bearing journals (5) and crank webs (7) and/or between main bearing journals (6) and the crank webs (7) of the crankshaft (4) by means of at least one impact tool (16) in order to correct the concentricity errors and/or the length deviation (ΔL1 ΔL2, ΔL3).

17 Claims, 7 Drawing Sheets

(51) Int. Cl.
  *B24B 39/04*  (2006.01)
  *B23P 9/02*  (2006.01)
  *B23P 9/04*  (2006.01)

(52) U.S. Cl.
  CPC ....... *B23P 2700/07* (2013.01); *F16C 2360/22* (2013.01)

(56) References Cited

U.S. PATENT DOCUMENTS

| | | | |
|---|---|---|---|
| 6,160,248 A | 12/2000 | Ottenwaelder et al. | |
| 8,011,096 B2 | 9/2011 | Reeb et al. | |
| 9,015,939 B2 | 4/2015 | Reeb et al. | |
| 9,676,017 B2 | 6/2017 | Nolten et al. | |
| 2007/0169532 A1* | 7/2007 | Reeb | B24B 5/42 72/460 |
| 2014/0130561 A1* | 5/2014 | Nolten | B21H 7/185 72/80 |
| 2014/0223707 A1 | 8/2014 | Leo et al. | |
| 2017/0165742 A1 | 6/2017 | Tanaka et al. | |

FOREIGN PATENT DOCUMENTS

| | | |
|---|---|---|
| DE | 102006058710 | 6/2008 |
| DE | 102007028888 | 1/2009 |
| DE | 102011113756 | 3/2013 |
| EP | 0788419 | 8/1997 |
| EP | 1034314 | 9/2000 |
| EP | 1479480 | 11/2004 |
| EP | 1612290 | 1/2006 |
| EP | 1716260 | 11/2006 |
| JP | S59101228 | 11/1984 |
| JP | H11333520 | 7/1999 |
| RU | 2063324 | 7/1996 |
| WO | 2006/110312 | 10/2006 |
| WO | 2015141611 | 4/2017 |

* cited by examiner

METHOD AND DEVICE FOR POST-PROCESSING A CRANKSHAFT

BACKGROUND OF THE INVENTION

The invention relates to a method for the post-processing of a crankshaft, in particular for the purposes of correcting concentricity errors and/or for the purposes of length correction, as per the preamble of claim 1.

The invention also relates to an apparatus for carrying out the method for the post-processing of a crankshaft.

The invention also relates to a crankshaft.

Owing to the continuously progressing development and increasing performance of internal combustion engines and stringent emissions requirements placed on these, modern engines are consequently subjected to ever greater loading. For this reason, the motor industry places high demands with regard to strength inter alia on the crankshaft, which is subjected to high loading and which is important for the function of an internal combustion engine. Here, in terms of construction, there is often the demand for the crankshaft to be of low weight and for the space requirement to be small. For the design of the crankshaft, this means that an increase in the load capacity should be achieved not by increasing the cross section, that is to say by means of the section modulus of the crankshaft, but as far as possible by means of local internal compressive stress states. For this reason, modern crankshafts are produced using a wide variety of machining and heat treatment methods, such that the crankshafts can be subjected to increasingly higher levels of engine power.

Examples of such methods are thermal treatments, such as the surface hardening methods of induction and case hardening, laser hardening or nitriding, and strain hardening methods, such as deep rolling, shot peening or impact hardening. These are common and for the most part well-established methods, which are suitable for a wide variety of purposes.

With regard to examples of such methods, reference is made to the following documents: EP 1 479 480 A1, EP 0 788 419 B1, EP 1 612 290 A1, DE 10 2007 028 888 A1 and EP 1 034 314 B1.

Impact hardening in particular is an advantageous method for increasing the fatigue strength, in particular the bending fatigue strength and the torsional fatigue strength, of crankshafts. The increase in the fatigue strength is achieved here by virtue of impact forces being introduced into the crankshaft by cold working, preferably hammering by means of special impact tools, in the loaded regions at transitions in cross section and changes in cross section. As examples for such a process, reference is made to DE 34 38 742 C2 and EP 1 716 260 B1.

With the increasing demands on an internal combustion engine, the demands on dimensional and position tolerances of the crankshaft also increase. Particular attention must also be paid in this regard to the concentricity and the length specifications for the crankshaft or for portions of the crankshaft. Exact compliance with the stringent specifications proves to be difficult in practice, in particular because the concentricity can possibly also vary during the course of the tempering and/or hardening processes, and the surface treatment processes can in some cases also result in a change in length of the crankshaft or of portions of the crankshaft. For this reason, it may arise in practice that a final finish machining process, or adjustment of the crankshaft in terms of its dimensional and position tolerances, is performed for example after a mechanical work hardening process. For this purpose, the length dimensions and the concentricity must lie in the required narrow limits.

Known and conventional methods for this purpose are for example the hot pressing of the crankshaft blanks and/or the expansion of portions of the crankshaft, for example such that the crankshaft is expanded between two crank webs. Using the known methods for the post-processing of the crankshaft, optimum concentricity and compliance with dimensional tolerances cannot be ensured in every case without damage to the crankshaft.

The present invention is accordingly based on the object of providing a method for the post-processing of the crankshaft which permits a correction of concentricity errors and/or a length correction with the least possible financial and technical outlay and which does not cause adverse component damage.

Said object is achieved, for the method, by means of the features specified in claim 1 and, for the apparatus for carrying out the method, by means of the features specified in claim 13.

Finally, the invention is also based on the object of providing a crankshaft which is improved, in particular with regard to its fatigue strength and its dimensional and position specifications.

With regard to the crankshaft, the object is achieved by means of the features specified in claim 14.

SUMMARY OF THE INVENTION

The dependent claims and the features described below relate to advantageous embodiments and variants of the invention.

The method according to the invention for the post-processing of a crankshaft is provided for the correction of concentricity errors and/or for length correction.

Furthermore, the invention may basically also be used for the correction of any dimensional and/or position tolerances of a crankshaft, for example for the purposes of ensuring concentricity, lengths, parallelism and/or perpendicularity or angularity in general.

The use of the invention is particularly preferably suitable in conjunction with the increasing of the fatigue strength of, for example, crankshafts with a length of 0.2 to 8 m or more and/or main and connecting-rod bearing journal diameters of 30 to 500 mm or more. The invention is however very particularly preferably suitable in conjunction with large crankshafts with a length of 1.5 to 8 m or more and/or main and connecting-rod bearing journal diameters of 100 to 500 mm or more.

Provision is made according to the invention whereby sectors of the crankshaft which cause and/or characterize concentricity errors are determined and/or, for at least one portion of the crankshaft, a length deviation from a setpoint length is determined, following which an impact force for correcting the concentricity errors and/or the length deviation is introduced into at least one defined transition radius between connecting-rod bearing journals and crank webs and/or between main bearing journals and the crank webs of the crankshaft by means of at least one impact tool.

The connecting-rod bearing journals and the main bearing journals will hereinafter in some cases also be referred to merely as "journals" for simplicity. Here, the expression "journals" may refer both to the connecting-rod bearing journals and to the main bearing journals, and also only to the connecting-rod bearing journals or only to the main bearing journals. Unless explicitly stated otherwise, all three variants are encompassed by the expression "journals" here.

The crankshaft may have various types of transition radii, for example fillets, for example in a basket arch shape, or also undercut radii or radii with transitions. The transition radii may for example transition tangentially into the bearing journal points or running surfaces of the main and connecting-rod bearing journals.

This also applies for transitions to flanges, journals and other geometrical changes in cross section both for tangential and undercut radii.

The crankshaft commonly has transition radii at all transitions or changes in cross section. This applies in particular to changes in cross section between bearing journals and crank webs. The invention is particularly suitable for introducing impact forces for the post-processing into transition radii between bearing journals and crank webs. The impact forces for the post-processing may however also be introduced into any other transition radii and/or into any other changes in cross section, in particular changes in cross section at the end sections of the crankshaft, in particular at a transition to a flange, a disk or a shaft etc. A transition radius into which the impact force for correcting concentricity errors and/or length deviation is introduced by means of the at least one impact tool thus need not imperatively be present between a connecting-rod bearing journal and a crank web or a main bearing journal and a crank web, but may rather be arranged at any location of the crankshaft. The expressions "connecting-rod bearing journal", "main bearing journal", "flange", "journal" and/or "crank web" may be reinterpreted accordingly by a person skilled in the art.

The invention will be described below substantially by means of the introduction of impact forces into transition radii between connecting-rod bearing journals and crank webs and/or main bearing journals and crank webs. This is however not to be understood as limiting, and is intended to serve merely for improved understanding or improved readability. Where reference is made to a transition radius in the context of the invention, this may basically be any transition radius at any location of the crankshaft.

The introduction of an impact force can be understood to mean that an impact head of an impact tool, or a so-called "header" of an impact device, impacts against that region of the crankshaft which is to be hardened, in the present case a transition radius. Here, the impact is performed in targeted fashion at the desired impact position or the impact positions along the transition radius running in annularly encircling fashion around the journal.

The expression "sectors of the crankshaft which characterize concentricity errors" is to be understood to mean sectors of the crankshaft which are characteristic of the determination of a respective concentricity error.

The sectors along a main axis of rotation, afflicted with runout, of a crankshaft may for example be axially distributed. In the case of a concentricity error, the main axis of rotation of the crankshaft commonly follows a curved profile, that is to say does not run in straight or linear fashion between the two ends of the crankshaft. The sectors that characterize the concentricity errors may be the sectors which define the curve in accordance with which the main axis of rotation of the crankshaft runs, in particular the start of the curve and/or the end of the curve (or the end regions of the crankshaft), extremes or maxima and/or minima of the curve, and/or inflection points of the curve.

The expression "sectors of the crankshaft which characterize concentricity errors" are to be understood to mean sectors of the crankshaft which trigger the concentricity errors and/or at which the concentricity errors are particularly pronounced. It is entirely possible here that a concentricity error that is particularly pronounced in one sector has been caused or triggered by a concentricity error present in another sector.

The sectors of the crankshaft which cause concentricity errors and the sectors of the crankshaft which characterize concentricity errors may also correspond.

The sectors of the crankshaft which are defined for the correction(s) may differ from the sectors of the crankshaft which characterize and/or cause the concentricity errors and/or which have the length deviation(s). The sectors may however also correspond or at least partially correspond.

Sectors which cause and/or characterize concentricity errors may typically constitute a part of the crankshaft, for example a region between two crank webs or a longer or shorter portion, possibly also the entire crankshaft. The sectors may possibly also be merely punctiform or ring-shaped or partially ring-shaped (in encircling fashion around the crankshaft).

The determination of the sectors of the crankshaft which cause and/or characterize concentricity errors may be performed in automated or manual fashion.

Analogously, the determination of the at least one portion of the crankshaft which has a length deviation from the setpoint length may also be performed in automated or manual fashion.

A correction of the concentricity errors and/or of the length deviation means an improvement measure which can result in a reduction of the concentricity errors and/or of the length deviation to the point of a complete elimination or prevention of the concentricity errors and/or of the length deviation. A correction of the concentricity errors may also be understood to mean a setting of concentricity, for example if a specific concentricity is to be predefined in targeted fashion for a crankshaft.

In the case of the correction of length deviations, the at least one portion of the crankshaft may be lengthened or shortened. Provision may also be made for at least one portion of the crankshaft to be lengthened and at least one further portion of the crankshaft to be shortened.

A particular advantage of the method according to the invention for post-processing is, compared with the prior art, that the fatigue strength of the crankshaft can be yet further increased simultaneously with the correction of the concentricity errors and/or of the length deviation. In fact, the post-processing, or correction of the concentricity errors and/or of the length deviation, according to the invention leads to a further improvement in the strength and/or the robustness of the crankshaft, because a method for impact hardening is used for this purpose.

If the crankshaft, for example owing to the forging, heat treatment, surface hardening or for other reasons, does not attain the setpoint length overall or in one portion, the crankshaft can be "lengthened" by means of the method according to the invention for post-processing through the introduction of the impact forces.

By means of the post-processing of the crankshaft in accordance with the invention after the production of said crankshaft, in particular after the mechanical work hardening of said crankshaft, particularly high dimensional accuracy can be achieved.

In one refinement of the invention, provision may be made whereby the transition radii of the crankshaft are hardened, preferably impact-hardened, prior to the determination of the concentricity errors and/or of the length deviation.

The correction of the concentricity errors and/or of the length deviation may basically also, in the case of corresponding determination of the impact force, be performed simultaneously with a method for the impact hardening for the introduction of internal compressive stresses into the crankshaft. Provision may thus for example be made whereby the sectors of the crankshaft which cause and/or characterize the concentricity errors, and/or the length deviation from the setpoint length, are determined continuously during an impact hardening process, wherein the impact forces are continuously adapted in order to perform the correction of the concentricity errors and/or of the length deviation simultaneously with the impact hardening. This may be advantageous in particular for the correction of the length deviation, because, in the case of a crankshaft that has already been impact-hardened, the retroactive "lengthening effect" is less than in the case of a crankshaft that has not yet been impact-hardened.

The crankshaft is however particularly preferably firstly impact-hardened such that the required or desired internal compressive stresses have already been introduced into the crankshaft before the concentricity errors and/or the length deviation are determined. This is advantageous in particular because the impact hardening process for the introduction of internal compressive stresses into the crankshaft possibly has an effect on the concentricity and/or the length deviation, which should preferably be taken into consideration for the post-processing according to the invention.

In one refinement, provision may be made in particular whereby the portion of the crankshaft in which the length deviation from the setpoint length is determined corresponds to a spacing between two crank webs, in particular to a so-called crankshaft throw, a partial length of the crankshaft, or the entire length of the crankshaft.

A correction of length deviation may be advantageous at various points of the crankshaft. For example, by means of the introduction of impact forces into the two transition radii of a main bearing journal, the spacing of the crank webs that adjoin the corresponding main bearing journal can be increased.

It is possible by means of the method according to the invention for post-processing to provide changes in length, in particular in the case of large crankshafts, of up to 50 mm, and/or improvements in concentricity of up to 90 mm, by means of the impact hardening. Even greater changes in length and/or improvements in concentricity may possibly also be provided.

A length correction and/or an improvement in concentricity may basically be provided already proceeding from concentricity errors or length deviations of only a few tenths of a millimeter.

A length variation of between 0.1 mm and 100 mm, preferably between 0.5 mm and 50 mm, for example between 1 mm and 25 mm, between 2 mm and 15 mm and/or between 5 mm and 10 mm, may be provided.

An improvement in concentricity of between 0.1 mm and 150 mm, preferably between 0.5 mm and 90 mm, for example between 1 mm and 45 mm, between 2 mm and 20 mm and/or between 5 mm and 10 mm, may be provided.

In one refinement of the invention, provision may furthermore be made whereby the at least one impact tool introduces an impact force for correcting the concentricity errors and/or the length deviation into highly loaded regions of the defined transition radii.

The inventors have recognized that the highly loaded regions of the crankshaft often also constitute the most effective regions for the introduction of impact forces such that concentricity errors and/or a length deviations can be corrected. Accordingly, the impact forces are preferably introduced into highly loaded regions of the defined transition radii.

In the present case, a highly loaded region means a region of the respective transition radius of the crankshaft which is subjected to particularly high loads, in particular during engine operation, for example tensile forces etc. For the load capacity of the crankshaft, the consideration of the highly loaded regions of the transition radii is of central importance. The highest internal compressive stresses should be preferentially introduced into these regions. For this reason, too, the introduction of the impact forces for the purposes of correction can be particularly advantageous in these regions of the crankshaft, because the robustness of the crankshaft can then be yet further improved at the highly loaded regions.

A transition radius running in annularly encircling fashion around the crankshaft or around the connecting-rod bearing journal and/or the main bearing journal generally has multiple regions subjected to differently intense loading.

For example, a region around the so-called bottom dead center of a connecting-rod bearing journal may be a highly loaded region within the meaning of the invention. The bottom dead center is the region which, during engine operation, can be referred to as tension side of the connecting-rod bearing journal or as being opposite the pressure side.

In one refinement of the invention, provision may be made whereby only transition radii situated in the sectors which cause the concentricity errors and/or situated in the at least one portion that has the length deviation are selected as defined transition radii.

The sectors in which the concentricity errors are particularly pronounced need not imperatively coincide with the sectors that trigger the concentricity errors. It is conceivable for the cause of a concentricity error to lie in one sector but for the concentricity error to be manifest in another sector. Provision may be made here whereby transition radii in the sector in which the concentricity error is manifest and/or transition radii in the sector that causes the concentricity error are selected. It is however typically to be assumed that the sectors correspond.

It has been found that it is advantageous if, for the correction of concentricity errors, impact forces are introduced only into the transition radii which are situated in the sector which causes the concentricity errors. As mentioned, the sectors may also correspond to the sectors which are characteristic of the concentricity errors.

The same applies analogously to the elimination of length deviations. For this purpose, too, it is advantageous if impact forces are introduced into transition radii which are situated in the portions in which the length deviation has been identified. If the length deviation is situated between two crank webs, for example of one crank web throw, provision is preferably made whereby the impact force is introduced into the transition radii between the bearing journal and the two crank webs such that the impact force pushes the two crank webs apart, whereby the crankshaft or the crankshaft throw is lengthened.

In one refinement, provision may be made whereby, for the correction of the length deviations, an impact force is introduced into all transition radii of the crankshaft by means of the at least one impact tool.

This measure is advantageous in particular if the overall length of the crankshaft deviates from the setpoint length. By virtue of the fact that the length deviation can be compensated by means of a preferably uniform "lengthening" or "shortening" in a manner distributed over the entire crankshaft, the total length of the crankshaft can normally be corrected without tolerances in parts of the crankshaft, for example spacings between two crankshafts, being overshot.

For a length correction, it is possible here for sectors in the connecting-rod bearing or connecting-rod bearing journal and/or sectors in the main bearing or main bearing journal to be selected which are suitable for the desired lengthening or shortening.

In one refinement of the invention, provision may furthermore be made whereby the nature of the concentricity error is determined, in particular whether an arcuate runout, a zigzag runout or a concentricity error in the end sections of the crankshaft is present, wherein the defined transition radii are selected on the basis of the nature of the concentricity error.

The nature of the concentricity error may be determined in particular through identification of the sectors of the crankshaft which characterize the concentricity errors. For example, an arcuate runout is characterized by a uniformly arcuate profile of the main axis of rotation of the crankshaft between the end sections of the crankshaft. The curve profile of the main axis of rotation therefore has a maximum in the center of the crankshaft. The (axial) position of the maximum and the end sections of the crankshaft may thus be the sectors of the crankshaft which are characteristic of the nature of the arcuate runout concentricity error and by means of which the nature of the concentricity error can be determined. In the case of a zigzag runout, the curve profile of the main axis of rotation of the crankshaft typically has further extremes. In the case of a concentricity error in the end sections, the curve profile of the main axis of rotation of the crankshaft may be straight, or run in a desired manner, between the end sections, whereas the profile of the main axis of rotation is curved at the end sections.

In one refinement, provision may be made in particular whereby the defined transition radii are determined on the basis of simulations, calculations and/or series of tests of a respective crankshaft type.

Depending on the respective crankshaft type, particular sectors or portions or transition radii may be particularly suitable for the introduction of the impact force for the correction of concentricity errors and/or for the correction of a length deviation. It may accordingly be advantageous for such sectors or portions or transition radii to be determined in advance.

As already discussed, the invention is additionally also suitable for the correction of any dimensional and position specifications. In one refinement of the invention, provision may thus also be made whereby, for at least one further shape and/or position specification, a deviation from a nominal dimension is determined, following which an impact force for correcting the at least one further deviation is introduced into at least one defined transition radius between one of the connecting-rod bearing journals and one of the crank webs and/or between one of the main bearing journals and one of the crank webs of the crankshaft by means of the at least one impact tool.

In particular, shape, orientation, profile and positions of regions of the crankshaft may be provided for post-processing and correction in accordance with the invention.

In one refinement of the invention, provision may be made whereby only transition radii either between the connecting-rod bearing journals and the crank webs or between the main bearing journals and the crank webs are selected as defined transition radii.

A directing of the method according to the invention to only one type of transition radii may be advantageous, because the corresponding impact tool then does not have to be reconfigured during the process, and the processing speed can thus be increased.

It is particularly preferable if only transition radii between the main bearing journals and the crank webs are selected as defined transition radii.

Even though a concentricity error generally runs only along the main bearing of the crankshaft, a correction by introduction of an impact force into transition radii between connecting-rod bearing journals and crank webs may also be expedient for the compensation of the concentricity error. The correction of the concentricity error by means of an introduction of the impact forces into transition radii between main bearing journals and crank webs of the crankshaft is however basically preferable.

In an alternative refinement, provision may be made whereby at least two impact tools are used and at least one transition radius between one of the connecting-rod bearing journals and one of the adjoining crank webs and at least one transition radius between one of the main bearing journals and one of the adjoining crank webs are selected as defined transition radii.

Depending on the crankshaft type and/or the use of the crankshaft, a corresponding selection of the defined transition radii may be advantageous.

In one particular variant of the invention, provision may be made whereby, for the introduction of an impact force for correcting the concentricity error and/or the length deviation into at least one of the transition radii along the respective transition radius running in annularly encircling fashion around the crankshaft, a highly loaded region, a lightly loaded region and interposed intermediate regions are defined, following which impact hardening is performed such that the impact force introduced into the intermediate regions is increased in the direction of the highly loaded region.

The methods and apparatuses according to the prior art provide that, during the impact hardening of a transition radius, a constant impact force is introduced along the respective transition radius running in annularly encircling fashion around the connecting-rod bearing journal and/or the main bearing journal. Here, the impact force is selected so as to suffice to introduce sufficient internal compressive stresses into the highly loaded regions of the crankshaft.

For the robustness of the crankshaft and for the correction of the concentricity errors and/or of the length deviation in accordance with the invention, it is however not imperatively necessary for the impact forces that are introduced into the highly loaded regions to also be introduced into the intermediate regions and/or into the lightly loaded regions. In this way, the outlay for the implementation of the method according to the invention can be reduced or optimized.

Accordingly, it may be advantageous for impact forces or high impact forces to be introduced only into the one or more highly loaded regions of the transition radii.

On the basis of simulations and test series, the inventors have found that the robustness or fatigue strength of the crankshaft can advantageously be realized with unchanged or improved quality even if the maximum impact force that is introduced into a particular transition radius is introduced only into the highly loaded region, and if the impact force is increased proceeding from the intermediate regions in the direction of the highly loaded region.

In this way, an abrupt or sudden change of the impact force from one impact to the next impact is avoided.

By virtue of the fact that the transition radii are no longer hardened in fully encircling fashion (with the same impact force), the processing speed can be maximized, and damage to the connecting-rod bearing journal at top dead center can be avoided or ruled out.

The focusing on the highly loaded regions of the transition radii can even result in a further improvement in robustness.

Basically, the method according to the invention and the apparatus according to the invention may also be applied or used in the case of crankshafts which have already been machined beforehand using other methods in order to increase the fatigue strength characteristics thereof. For example, a crankshaft that has been hardened by induction hardening can retroactively also be improved with regard to its bending and torsional fatigue strength by means of an introduction of internal compressive stresses with simultaneous or subsequent correction of dimensional and position tolerances, in particular of the concentricity and of the length.

In one variant of the invention, provision may be made whereby the impact force introduced into the intermediate regions is increased steadily in the direction of the highly loaded region.

In particular, a highly loaded region may be provided which is surrounded on both sides by intermediate regions, whereby the highly loaded region is separated from the lightly loaded region.

Provision may basically be made whereby the impact force within the intermediate regions and/or the lightly loaded region follows any desired profile, wherein it is however preferable for abrupt changes in the impact force to be avoided, and for the impact force to preferably be at its highest (in particular at a maximum, considered in terms of an average and/or in a sum of all individual impact forces of the transition radius) in the highly loaded region of the transition radius.

The impact force introduced into the intermediate regions is preferably increased monotonously, very particularly preferably strictly monotonously, in the direction of the highly loaded region.

Provision may be made whereby the impact force introduced into the intermediate regions is increased uniformly and/or linearly in the direction of the highly loaded region.

It is also possible for the impact force introduced into the intermediate regions to be increased in the direction of the highly loaded region in accordance with any desired mathematical function.

Provision may be made whereby no impact force or only an impact force lower than or equal to the lowest impact force introduced into the intermediate regions is introduced into the lightly loaded region.

Provision may preferably be made whereby no impact force is introduced into the lightly loaded region of the transition radius.

In one variant of the invention, provision may finally also be made whereby an impact force higher than or equal to the highest impact force introduced into the intermediate regions of the transition radius is introduced into the highly loaded region.

It is preferably the case that only the impact force required to attain the desired fatigue strength and/or for the post-processing is introduced in each region, wherein the impact force is increased or reduced preferably uniformly in the direction of regions for which a different impact force is advantageous.

In one variant of the invention, provision may be made in particular whereby the impact force that is introduced into the highly loaded region is determined on the basis of the desired fatigue strength of the crankshaft, the desired fatigue strength of parts of the crankshaft and/or the desired correction of the concentricity errors and/or the length deviation.

It may be sufficient, in order to attain the desired fatigue strength of the crankshaft and/or the desired fatigue strength of portions of the crankshaft and/or the desired correction of concentricity errors and/or for the length correction, to introduce impact forces only into the highly loaded regions.

In one variant of the invention, provision may also be made whereby the impact force that is introduced into the highly loaded region is constant or is kept constant over the highly loaded region.

In simulations and tests, it has been found that a high fatigue strength and/or robustness of the crankshaft can be achieved in particular by introducing a (high) impact force with a constant intensity into the highly loaded region. This applies in particular (but not exclusively) if, proceeding from the highly loaded region, impact forces of decreasing intensity, in particular impact forces which decrease linearly from one impact to the next impact, are introduced in each case into the intermediate regions, which impact forces may be reduced to zero in the lightly loaded region.

In one variant of the invention, provision may be made whereby, along the transition radius running in annularly encircling fashion around the connecting-rod bearing journal, the highly loaded region amounts to at least $\pm 20°$, preferably at least $\pm 30°$, more preferably at least $\pm 40°$, particularly preferably at least $\pm 50°$, very particularly preferably at least $\pm 60°$, for example at least $\pm 70°$, at least $\pm 80°$ or at least $\pm 90°$, proceeding from a most highly loaded point of the connecting-rod bearing journal.

It is also possible for an upper limit for the extent of the highly loaded region along the transition radius running in annularly encircling fashion around the connecting-rod bearing journal to be defined, according to which the highly loaded region amounts to at most $\pm 90°$, preferably at most $\pm 80°$, more preferably at most $\pm 70°$, very particularly preferably at most $\pm 60°$, for example $\pm 50°$, for example at most $\pm 40°$, at most $\pm 30°$ or at most $\pm 20°$, proceeding from the most highly loaded point of the connecting-rod bearing journal.

The most highly loaded point of the connecting-rod bearing journal is in particular the bottom dead center of the connecting-rod bearing journal.

Provision may thus be made in particular whereby the highly loaded region is defined along the circumference of a journal proceeding from a most highly loaded point of the journal.

In one variant of the invention, provision may furthermore be made whereby, along the transition radius running in annularly encircling fashion around the main bearing journal, the highly loaded region amounts to at least $\pm 20°$, preferably at least $\pm 30°$, more preferably at least $\pm 40°$, particularly preferably at least $\pm 50°$, very particularly preferably at least $\pm 60°$, for example at least $\pm 70°$, at least $\pm 80°$ or at least $\pm 90°$, proceeding from a most highly loaded point of the main bearing journal.

It is also possible for an upper limit for the extent of the highly loaded region along the transition radius running in annularly encircling fashion around the main bearing journal to be defined, according to which the highly loaded region amounts to at most $\pm 90°$, preferably at most $\pm 80°$, more preferably at most $\pm 70°$, very particularly preferably at most ±60°, for example at most ±50°, for example at most ±40°, at most ±30° or at most ±20°, proceeding from a most highly loaded point of the main bearing journal.

This also applies analogously for transitions to flanges, journals and other geometrical changes in cross section both for tangential and undercut radii.

Simulations and/or calculations and/or series of tests of the respective crankshaft type may be taken into consideration for determining the highly loaded region or the most highly loaded point.

The respective highly loaded regions or the respective most highly loaded points of the transition radii may differ in the individual transition radii of the crankshaft. The highly loaded region or the most highly loaded point may however also correspond in all transition radii, in particular in one type of transition radii. The highly loaded region or the most highly loaded point may possibly correspond in all transition radii firstly between connecting-rod bearing journals and crank webs and secondly between main bearing journals and crank webs.

The same also applies to the one or more intermediate regions and to the lightly loaded region.

The highly loaded region may basically have any desired size, for example may also be smaller than ±20° or greater than ±90°, proceeding from the bottom dead center of the connecting-rod bearing journal or the most highly loaded point of the main bearing journal.

In one variant of the invention, it may in particular be defined that the most highly loaded point (in particular with respect to torsion) of a transition radius of a main bearing journal lies, in the cross section of the crankshaft, at the point of intersection of the transition radius of the main bearing journal with the connecting line of the central points of the main bearing journal and of the connecting-rod bearing journal adjoining the transition radius of the main bearing journal.

The most highly loaded point of a transition radius of a main bearing journal may be arranged on a side of the crankshaft averted from the bottom dead center of an adjoining connecting-rod bearing journal.

In one variant of the invention, provision may be made whereby the introduction of the impact forces is performed in such a way that the impressions of an impact head of at least one impact tool overlap in a defined manner along the respective transition radius running in annularly encircling fashion around the crankshaft (in particular around the connecting-rod bearing journal and/or main bearing journal).

By means of overlapping impact impressions and/or closely arranged and exactly defined impact positions, a particularly effective increase in the fatigue strength or bending fatigue strength and torsional fatigue strength with simultaneous correction of concentricity errors and length deviations can be achieved.

In one variant of the invention, provision may furthermore be made whereby the impact head of the at least one impact tool introduces the impact force into the transition radius at an adjustable impact angle.

The impact force can therefore be introduced into the transition radius at an angle which is exactly adapted to the most highly loaded point during the operation of the crankshaft or the loading maximum and its extent into the crankshaft, taking into consideration the bending loading and the torsional loading.

Provision may be made whereby an impact device is used which has an impact piston, a deflecting unit and the at least one impact tool, wherein the at least one impact tool is fastened to the deflecting unit, and wherein the impact piston transmits an impulse via the deflecting unit to the at least one impact tool, following which the impact head of the at least one impact tool introduces the impact force into the transition radius at the impact angle.

For this purpose, an impact piston may be used which transmits an intense pulse or an impulse (generated for example pneumatically, hydraulically and/or electrically) to the impact head.

Depending on the impact force, visible impact impressions of the impact head are formed at the respective impact positions. The depth of the impact impressions and the quality or the depth effect of the introduced internal compressive stresses are in this case dependent on the selected impact force. The tool and the process parameters are preferably exactly coordinated with the respective crankshaft and, here, if appropriate, with partial geometrical changes (changes in cross section).

The impact force in turn can, through variation of the impact angle, be individually set or aligned even more exactly to or with the loading maximum.

Provision may be made whereby the crankshaft is firstly rotated by means of a drive device along a direction of rotation into an impact position. This can be achieved with a closed-loop position controller (point-to-point movement) of the crankshaft.

For example, an open-loop position controller may be used in order to rotate the crankshaft in stepped or clocked fashion from one impact position to the next impact position. In the simplest case, an open-loop PTP controller or point controller may be provided for this purpose.

The drive device may comprise a motor, in particular an electric motor. The electric motor may basically be any electric motor, for example a three-phase motor (in particular a three-phase asynchronous machine), an AC motor, a DC motor or a universal motor.

A stepper motor may preferably be used.

It is also possible for a two-part drive device to be provided, in the case of which, for example, a motor is provided at each end of the crankshaft, that is to say a synchronous drive or bilateral drive of the crankshaft.

Provision may be made whereby the at least one impact tool performs an impact movement, or introduces the impact force, with a periodicity, preferably with a timing or impact frequency of 0.5 Hz to 30 Hz, particularly preferably with a timing of 0.5 Hz to 5 Hz and very particularly preferably with a timing of 0.5 Hz to 3 Hz.

Other timings, for example also impact frequencies between 0.1 Hz and 50 Hz, may self-evidently also be provided, but the values stated above are very particularly suitable.

The impact pressures that can be implemented by the impact piston to generate the impact force may depending on the operating mode amount to between 10 and 300 bar, preferably between 30 and 180 bar, and particularly preferably between 50 and 130 bar.

The temperature in the region of the crankshaft segment or transition radius to be machined should preferably be no higher than 65° C.; values between 12° C. and 25° C. are preferred.

The impact forces that are introduced into a transition radius for the post-processing according to the invention may also be introduced into the transition radius in encircling fashion several times around the crankshaft or the journal. Provision may thus also be made for impact forces to be introduced into regions of the transition radius into which impact forces have already been introduced for the post-processing of the crankshaft.

Provision may be made for the introduction of the impact force to be commenced in the lightly loaded region (or in an intermediate region, in particular if no impact force is to be introduced in the lightly loaded region) and for the impact force to be increased proceeding from said region in the direction of the highly loaded region.

For example, provision may be made for a first impact force to firstly be introduced over 360° around the annularly encircling transition radius, and for a second impact force, which may also be identical to the first impact force, to subsequently be introduced into the intermediate regions and the highly loaded regions, and for a third impact force, which may also be identical to the first and/or second impact force, to be introduced into the highly loaded region in a third revolution. The impact force may thus basically also be increased, for example proceeding from the intermediate regions, in the direction of the highly loaded region, by virtue of impact forces being introduced in multiple revolutions into the annularly encircling transition radius for the post-processing according to the invention. The impact force may thus also be introduced as the sum of multiple individual impact forces.

The present invention may also be defined in that the use of a method for the impact hardening of transition radii of a crankshaft, in particular for the impact hardening of transition radii between connecting-rod bearing journals and crank webs and/or transition radii between main bearing journals and the crank webs of the crankshaft, is claimed for post-processing the crankshaft for the correction of concentricity errors and/or for length correction.

With regard to the advantageous use and possible manifestations of the known impact hardening method in order to use this for the post-processing, reference is made to the description above and below of the method for the post-processing of the crankshaft.

The invention furthermore relates to an apparatus for carrying out an above-described method for the post-processing of a crankshaft.

Features that have already been described in conjunction with the method according to the invention are self-evidently also advantageously implementable for the apparatus according to the invention, and vice versa. Furthermore, advantages that have already been mentioned in conjunction with the method according to the invention can also be understood as relating to the apparatus according to the invention, and vice versa.

Some of the components of the apparatus according to the invention may basically correspond in terms of their construction to the apparatus according to EP 1 716 260 B1, for which reason the content of disclosure of EP 1 716 260 B1 is, in its entirety, integrated into the present disclosure by reference.

The invention also relates to a crankshaft produced in accordance with a method described above.

The crankshaft according to the invention differs from conventional crankshafts in particular in that, for the post-processing thereof, impact forces have been introduced into at least one of the transition radii. This can result in a characteristic configuration of the crankshaft. This applies in particular when the im-pact force has been introduced with different intensities in different regions along the respective annularly encircling transition radius.

BRIEF DESCRIPTION OF THE FIGURES

Exemplary embodiments of the invention will be described in more detail below on the basis of the drawing.

The figures each show preferred exemplary embodiments, in which individual features of the present invention are illustrated in combination with one another. Features of an exemplary embodiment are also implementable separately from the other features of the same exemplary embodiment, and may accordingly be readily combined by a person skilled in the art with features of other exemplary embodiments in order to form further meaningful combinations and sub-combinations.

In the figures, functionally identical elements are denoted by the same reference designations.

In the figures, in each case schematically:

FIG. 1 shows an overall view of an apparatus according to the invention for carrying out the method in a first embodiment;

FIG. 2 shows a perspective view of a part of the apparatus according to the invention for carrying out the method in a second embodiment;

FIG. 3 shows an impact device with two impact tools in an enlarged illustration as per the detail "A" from FIG. 1;

FIG. 4 shows an impact device with only one impact tool;

FIG. 5 shows an exemplary crankshaft with exemplary length deviations in exemplary portions of the crankshaft;

FIG. 6 shows an exemplary crankshaft with a concentricity error in the manner of an arcuate runout;

FIG. 7 shows an exemplary crankshaft with a concentricity error in the manner of a zigzag runout;

FIG. 8 shows an exemplary crankshaft with a concentricity error in the end sections of the crankshaft;

FIG. 9 shows an exemplary detail of a further crankshaft;

FIG. 10 shows a section through the crankshaft of FIG. 9 in accordance with the section line X;

Figure 11:
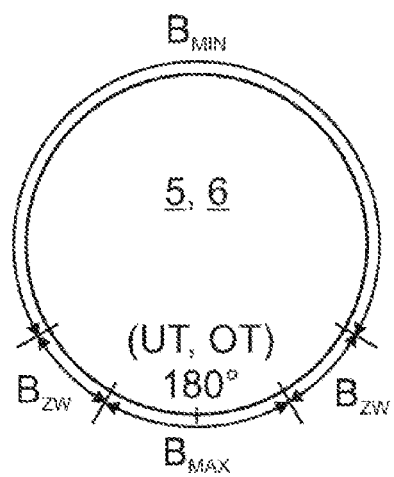
Figure 12:
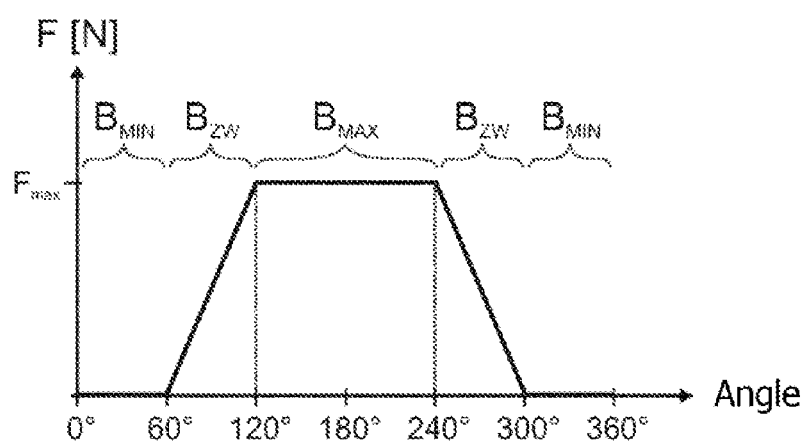
Figure 13:
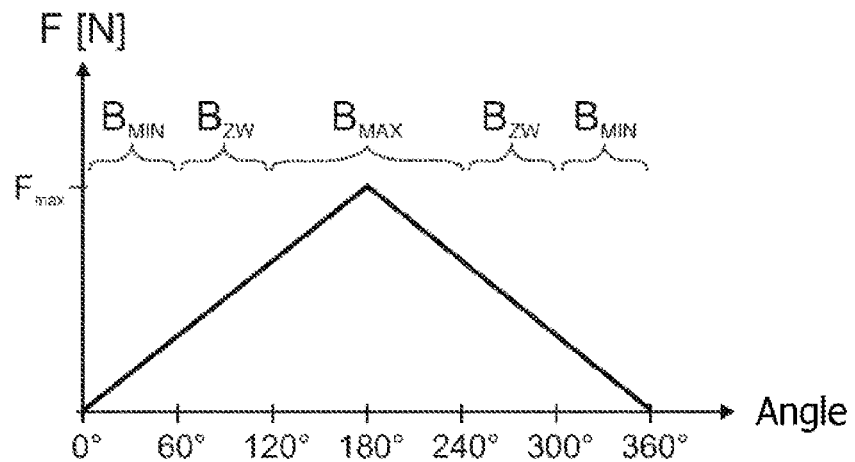
Figure 14:
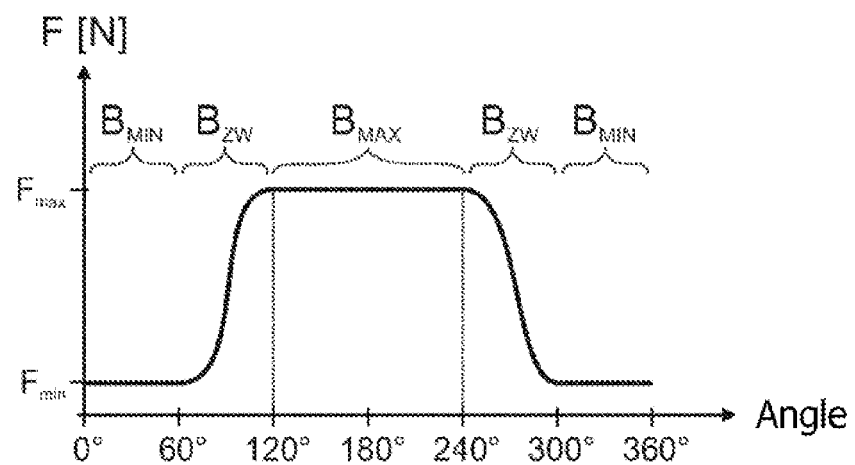
Figure 15:
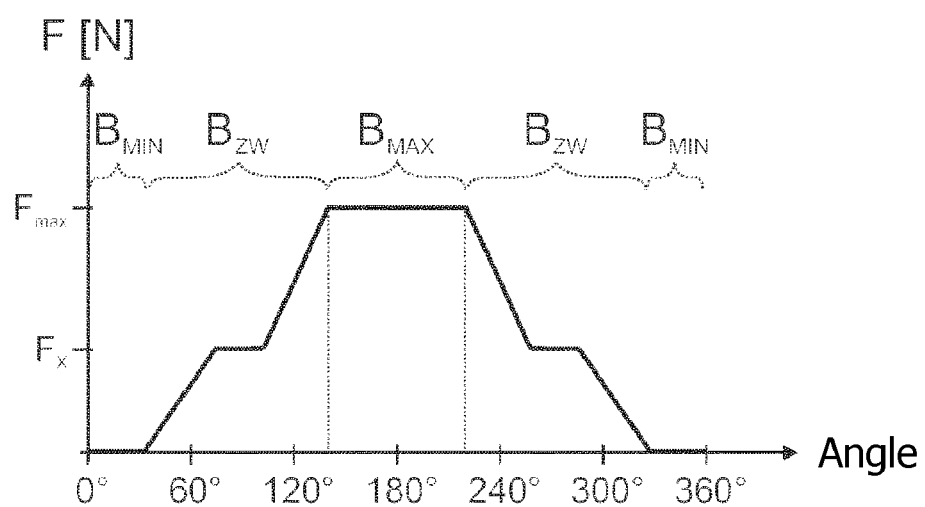

FIG. 11 shows an exemplary division of an annularly encircling transition radius into a highly loaded region, a lightly loaded region and interposed intermediate regions of an exemplary journal;

FIG. 12 shows an exemplary distribution of impact forces along a transition radius, running in annularly encircling fashion around a journal, in a first embodiment;

FIG. 13 shows an exemplary distribution of impact forces along a transition radius, running in annularly encircling fashion around a journal, in a second embodiment;

FIG. 14 shows an exemplary distribution of impact forces along a transition radius, running in annularly encircling fashion around a journal, in a third embodiment; and FIG. 15 shows an exemplary distribution of impact forces along a transition radius, running in annularly encircling fashion around a journal, in a fourth embodiment.

DETAILED DESCRIPTION OF THE INVENTION

The apparatus illustrated in an overall view in FIG. 1 basically corresponds in terms of its construction to the apparatuses as per DE 34 38 742 C2 and EP 1 716 260 B1 with one or more impact devices 1, for which reason only the important parts, and the differences in relation to the prior art, will be discussed in more detail below.

The apparatus has a machine bed 2 and a drive device 3. The drive device 3 is used to move or rotate a crankshaft 4 along a direction of rotation into an impact position.

The crankshaft 4 has connecting-rod bearing journals 5 and main bearing journals 6, between which crank webs 7 are arranged in each case. Transition radii 8 (see FIGS. 3 to 9) are formed between connecting-rod bearing journals 5 and crank webs 7 and between main bearing journals 6 and crank webs 7, or generally between transitions in cross section of the crankshaft 4.

At that side of the crankshaft 4 which faces toward the drive device 3, there is provided a fastening device 9 which has a clamping disk or a fastening flange 10. On that side of the crankshaft 4 which is averted from the drive device 3, a support 11 preferably in the manner of a tailstock is provided, which has a further fastening device 9 for the purposes of rotatably receiving or rotatably fixing the crankshaft 4. Optionally or in addition to the support 11, a back rest may be provided which is positioned at a rotationally symmetrical location.

The drive device 3 is capable of setting the crankshaft 4 in rotation motion along an axis of rotation C. Provision may be made here whereby the main axis of rotation $C_{KW}$ of the crankshaft 4 is positioned eccentrically from the axis of rotation C of the drive device 3, as illustrated in FIG. 1 and FIG. 2. For this purpose, it is preferably possible for alignment means 17 (see FIG. 2) to be provided in the region of the fastening device 9. Here, provision may be made whereby the alignment means 17 displace a central axis of the journal 5, 6 that is respectively to be hardened such that the central axis of the journal 5, 6 lies on the axis of rotation C.

A direct drive, preferably without a clutch, may be provided for the drive device 3. A motor, preferably an electric motor, of the drive device 3 can thus be coupled without a transmission ratio or transmission to the fastening device 9 or to the crankshaft 4.

The impact devices 1 described in more detail by way of example below are each held adjustably in a displacement and adjustment device 15 in order to adapt them to the position of the connecting-rod bearing journals 5 and of the main bearing journals 6 and to the length of the crankshaft 4.

Figure 1:
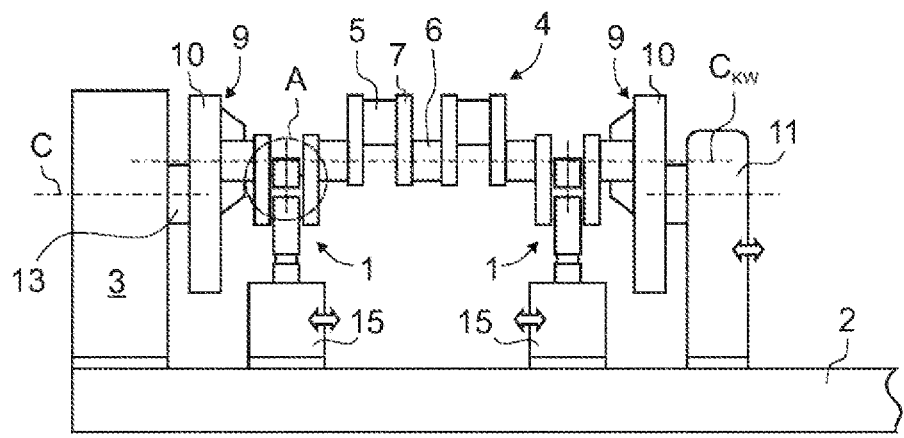
Figure 2:
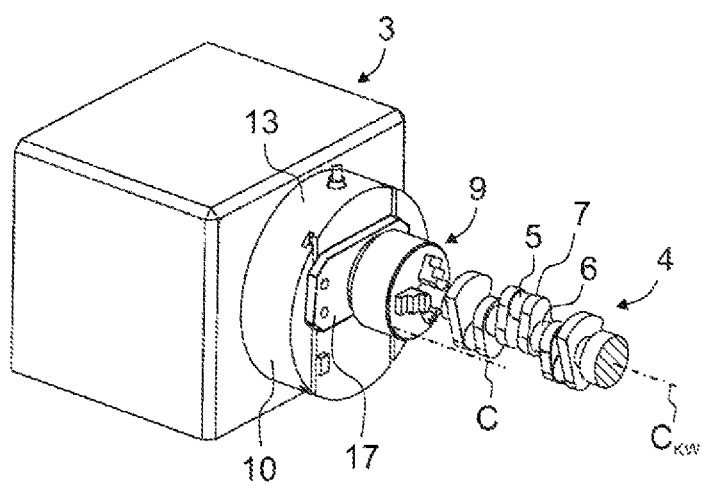
Figure 3:
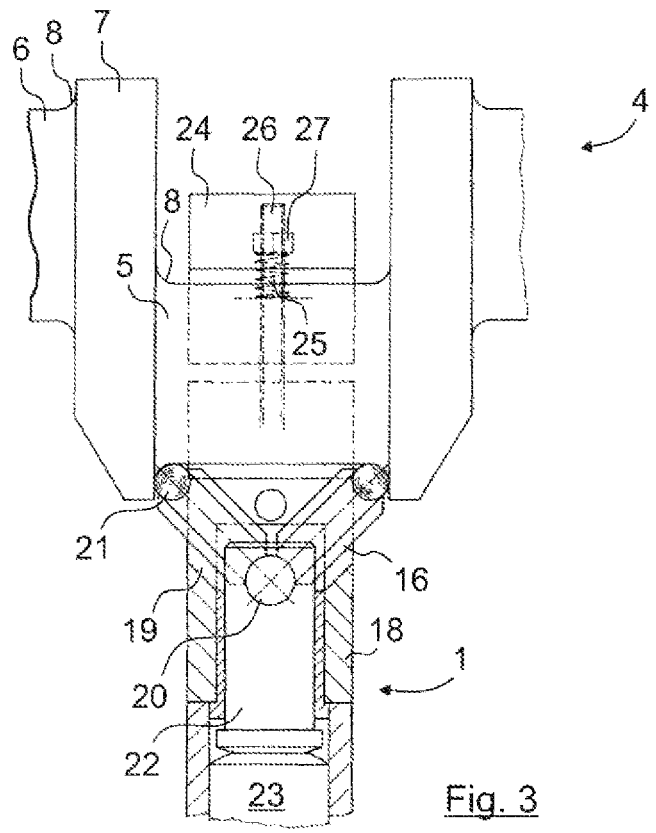

The support 11 may also be designed to be displaceable, as indicated by the double arrows in FIG. 1.

Two impact devices 1 are illustrated in FIG. 1, though basically any number of impact devices 1 may be provided, for example also only a single impact device 1.

Provision may also be made whereby at least one impact device 1 is designed and configured for introducing impact forces into the transition radii 8 of the main bearing journals 6 and one impact device 1 is designed and configured for introducing impact forces into the transition radii 8 of the connecting-rod bearing journals.

According to the invention, a method for the post-processing of a crankshaft 4 is provided, in particular for the correction of concentricity errors and/or for the length correction of the crankshaft 4.

Here, provision is made whereby sectors $S_1, S_2, S_3, S_4, S_5, S_6$ (see the following FIGS. 6 to 8) of the crankshaft 4 which characterize the concentricity errors are firstly determined.

Alternatively or in addition, but not illustrated here, sectors which cause the concentricity errors may also be determined. The sectors which respectively characterize and cause the concentricity errors may also coincide, for example in the case of the sectors $S_3$ and $S_4$.

Alternatively or in addition, at least one length deviation $\Delta L_1, \Delta L_2, \Delta L_3$ from a setpoint length $L_1, L_2, L_3$ (see the following FIG. 5) of at least one portion of the crankshaft 4 is determined. According to the invention, subsequently, an impact force $F_S$ for correcting the concentricity errors and/or the length deviation is introduced into at least one defined transition radius 8 between one of the connecting-rod bearing journals 5 and one of the crank webs 7 and/or into at least one transition radius 8 between one of the main bearing journals 6 and one of the crank webs 7 of the crankshaft 4 by means of at least one impact tool 16.

The apparatus illustrated in FIG. 1, which is basically designed for the impact hardening of a crankshaft 4, may be used for the introduction of the impact force $F_S$. Here, provision is preferably made whereby the transition radii 8 of the crankshaft 4 are hardened, preferably impact-hardened, prior to the determination of the concentricity error and/or of the length deviation $\Delta L_1, \Delta L_2, \Delta L_3$. Provision may however also be made whereby the post-processing of the crankshaft 4 is performed simultaneously with the impact hardening of the crankshaft 4.

The invention may also, in addition to the correction of concentricity errors and/or the correction of length deviations, be used for the post-processing of a crankshaft 4 for the correction of further dimensional and position tolerances. For example, provision may be made whereby, for at least one further shape and/or position specification, a deviation from a nominal dimension is determined, following which an impact force $F_S$ for correcting the at least one further deviation is introduced into at least one defined transition radius 8 between one of the connecting-rod bearing journals 5 and one of the crank webs 7 and/or into at least one transition radius 8 between one of the main bearing journals 6 and one of the crank webs 7 of the crankshaft 4 by means of the at least one impact tool 16.

FIG. 2 illustrates, in a perspective view, a detail of a further apparatus for carrying out the method according to the invention but without an impact device. Here, the apparatus of FIG. 2 is substantially identical to the apparatus of FIG. 1, for which reason only the important differences will be referred to in detail below.

A drive device 3 is once again provided. Furthermore, a fastening device 9 is provided which has a fastening flange 10 and, fastened thereto, a face plate with clamping jaws for fixing the crankshaft 4. The face plate with the clamping jaws of the fastening device 9 is arranged on the fastening flange 10 adjustably on an alignment means 17, whereby the longitudinal axis $C_{KW}$ of the crankshaft 4 can be displaced relative to the axis of rotation C of a drive shaft or of an input shaft 13.

The crankshaft 4 of FIG. 2 has a configuration which deviates from the embodiment illustrated in FIG. 1, but basically likewise comprises connecting-rod bearing journals 5, main bearing journals 6 and crank webs 7.

In FIG. 2 (as in FIG. 1), a further fastening device 9 may be provided at that end of the crankshaft 4 which is averted from the drive device 3, though said further fastening device may also be omitted.

The invention may basically be implemented with any impact device 1. An impact device 1 of FIG. 1 is illustrated in more detail by way of example in FIG. 3. It has a main body 18 which may be provided with a prismatic abutment correspondingly to the radius of the crankshaft segment to be machined, and which preferably has guides 19 which guide two impact tools 16 in their support plane and provide them with a corresponding degree of freedom in terms of the support angle about a deflecting unit 20, which is advantageous for the adaptation to the dimensional conditions of the crankshaft 4. In each case one ball as impact head 21 is arranged at the front ends of the two impact tools 16. An intermediate part 22 produces the connection between an impact piston 23 and the deflecting unit 20, which transmits the impact energy to the impact tools 16. The intermediate part 22 may possibly also be omitted.

To increase the effectiveness of the impact, a clamping prism 24 may be fastened, via springs 25, by means of adjustable clamping bolts 26 with clamping nuts 27 to that side of the journal 5, 6 which is averted from the main body 18. Other structural solutions are also possible here.

It should be understood that, where a part of the description refers to "an impact tool" or "an impact device" or where "multiple impact tools/impact devices" are mentioned, this may basically mean any number of impact tools/impact devices, for example two, three, four, five, six, seven, eight, nine, ten or more. The reference to a plurality or singularity is provided merely for the sake of better readability, and is not limiting.

By means of the arrangement of multiple impact devices 1 over the length of the crankshaft 4 to be machined, it is possible, as required, for all centrally and possibly eccentrically running regions of the crankshaft 4 to be machined simultaneously.

The impact piston 23 transmits an impulse to the impact tools 16 via the deflecting unit 20, whereby the impact heads 21 of the impact tools 16 introduce the impact force $F_S$ into the transition radii 8.

The expression "$F_S$" and similar expressions in the present description are to be understood merely as placeholders/variables for any impact force that appears appropriate to a person skilled in the art. Here, where the description refers to "the impact force $F_S$", this may thus refer in each case to different or else identical impact forces.

Figure 4:
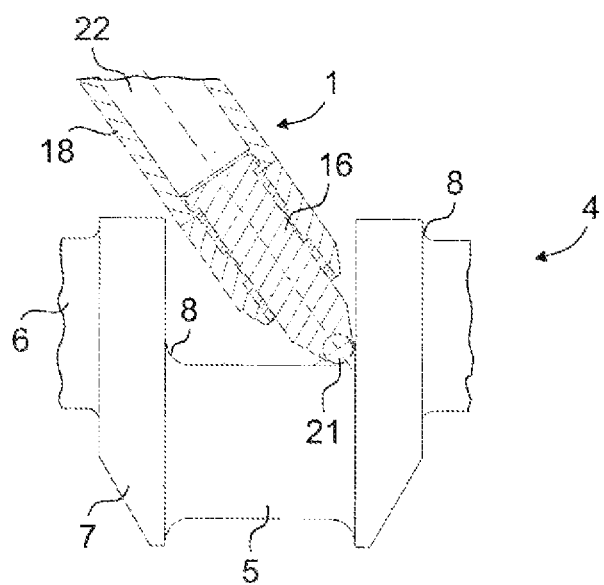

FIG. 4 shows an impact device 1 which is equipped with only one impact tool 16. In the exemplary embodiment shown, the impact device 1 is preferably inclined relative to the crankshaft 4, specifically such that the impact tool 16, which is arranged coaxially with respect to the longitudinal axis of the impact device 1, impacts perpendicularly against the region of the crankshaft segment to be machined, in the present case of the transition radius 8 to be machined. In this case, although it is possible for in each case only one crankshaft segment to be machined, the structural design and the transmission of force by the impact device 1 are on the other hand better and simpler.

This embodiment has proven particularly advantageous for use on non-symmetrical crankshaft segments of the crankshaft 4. The embodiment is also suitable for introducing impact forces, for the purposes of correcting concentricity errors and length deviations, only in one of two transition radii 8 adjoining the same journal 5, 6.

Figure 5:
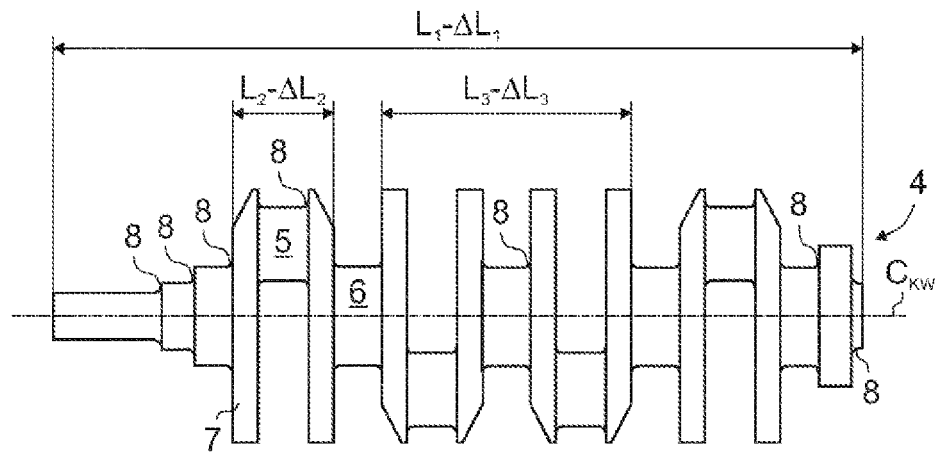
Figure 6:
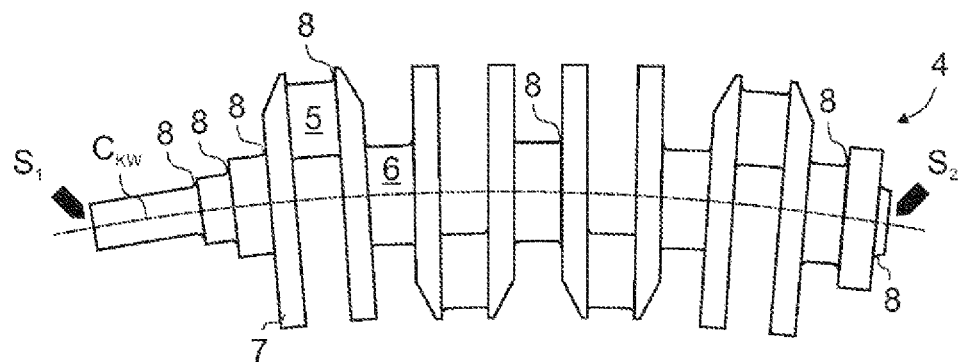

FIG. 5 illustrates an exemplary crankshaft 4 with respective transition radii 8 between connecting-rod bearing journals 5 and crank webs 7 and between main bearing journals 6 and crank webs 7, and further cross-sectional transitions with transition radii 8. Here, exemplary portions are illustrated in which the length deviations $\Delta L_1$, $\Delta L_2$, $\Delta L_3$ from a corresponding setpoint length $L_1$, $L_2$, $L_3$ are determined. Such a portion of the crankshaft 4 may in this case also cover the entire length of the crankshaft 4, which is illustrated in the exemplary embodiment as the difference of the length deviation $\Delta L_1$ from the setpoint length $L_1$. The illustrated crankshaft 4 in FIG. 5 is therefore too short by the length deviation $\Delta L_1$. The portions of the crankshaft 4 in which the length deviations $\Delta L_1$, $\Delta L_2$, $\Delta L_3$ are determined may have any desired length, and the length may for example also correspond to the spacing between two crank webs 7. In the exemplary embodiment of FIG. 5, a length deviation $\Delta L_2$ from a setpoint length $L_2$ of a so-called crankshaft throw, that is to say the sequence crank web 7/connecting-rod bearing journal 5/crank web 7 is illustrated by way of example. The region of the crankshaft 4 in which the length deviation $\Delta L_1$, $\Delta L_2$, $\Delta L_3$ is determined may also cover any desired partial length of the crankshaft 4. Also illustrated in the exemplary embodiment is a length deviation $\Delta L_3$ from a setpoint length $L_3$ in the central region of the crankshaft 4, which encompasses, by way of example, three crankshaft throws.

By means of the introduction of the impact force $F_S$ in accordance with the invention into defined transition radii 8 of the crankshaft 4, the length deviations $\Delta L_1$, $\Delta L_2$, $\Delta L_3$ can be advantageously corrected. For this purpose, it is for example possible for transition radii 8 which are situated in portions which cause the length deviations $\Delta L_1$, $\Delta L_2$, $\Delta L_3$ to be selected. Provision may however also be made, in particular for the correction of the length deviation $\Delta L_1$ of the entire crankshaft 4, for an impact force $F_S$ to be introduced into all transition radii 8 of the crankshaft 4 by means of the at least one impact tool 16.

As mentioned in the introduction, the invention is also particularly suitable for the correction of concentricity errors. Various types of concentricity errors are known from practice. It may be advantageous here to firstly determine the nature of the concentricity error, in particular whether an arcuate runout (illustrated in FIG. 6), a zigzag runout (illustrated in FIG. 7) or a concentricity error in the end sections of the crankshaft 4 (illustrated in FIG. 8) is present, wherein the defined transition radii 8 are selected on the basis of the nature of the concentricity error. A crankshaft 4 with a concentricity error in the manner of an arcuate runout is depicted by way of example in FIG. 6. An arcuate runout is characterized substantially by a curved profile of the main axis of rotation $C_{kw}$ of the crankshaft 4.

For the correction of the concentricity, in the exemplary embodiments, the sectors $S_1$, $S_2$, $S_3$, $S_4$, $S_5$, $S_6$ of the crankshaft 4 which characterize the concentricity error are firstly determined. An arcuate runout may be characterized for example by the illustrated sectors $S_1$, $S_2$ at the ends of the crankshaft 4 and possibly a further sector (not illustrated) in the center of the crankshaft 4, which relates to the maximum or the extreme value of the curve profile of the main axis of rotation $C_{KW}$ of the crankshaft 4.

Figure 7:
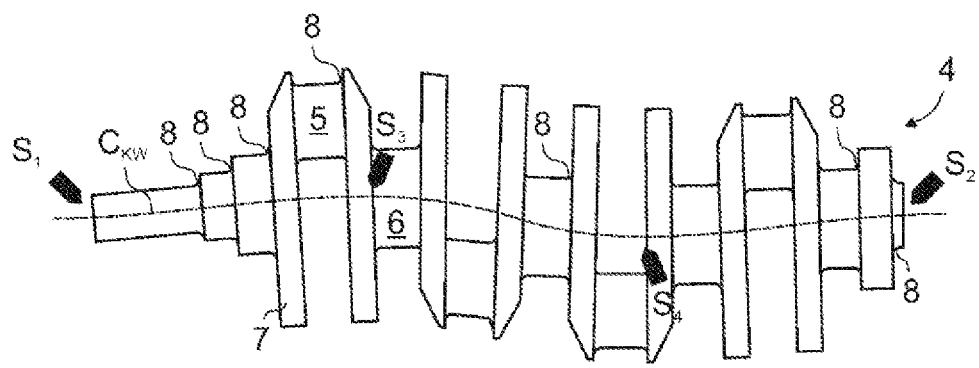

FIG. 7 illustrates a concentricity error in the manner of a zigzag runout. A zigzag runout is characterized by a curved profile of the main axis of rotation $C_{KW}$ of the crankshaft 4 with at least two extremes. In addition to the characterizing sectors $S_1$, $S_2$ at the ends of the crankshaft 4, the sectors $S_3$, $S_4$ of the extremes of the curve profile of the main axis of rotation $C_{KW}$ of the crankshaft 4 can be taken into consideration. A correction of the concentricity error illustrated in FIG. 7 may be realized for example through the introduction of an impact force $F_S$ into a transition radius 8 close to the sectors $S_3$, $S_4$ that describe the extremes of the curve profile of the main axis of rotation $C_{KW}$ of the crankshaft 4.

Figure 8:
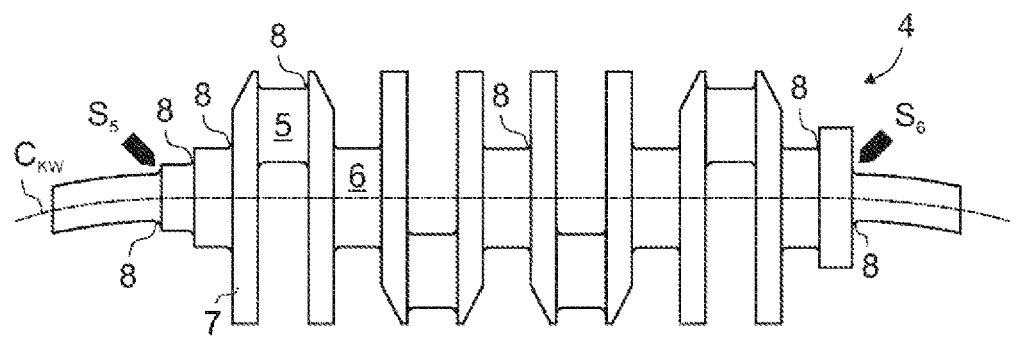

Finally, FIG. 8 illustrates a concentricity error in the end sections of the crankshaft 4, which can be characterized for example by the sectors $S_5$, $S_6$. Between these characterizing sectors $S_5$, $S_6$, the profile of the main axis of rotation $C_{KW}$ of the crankshaft 4 is substantially linear.

For the correction, it is preferably possible for those transition radii 8 which are situated in the sectors $S_3$, $S_4$, $S_5$, $S_6$ to be selected. The extent of the concentricity error is at its greatest in the sectors $S_3$, $S_4$, $S_5$, $S_6$, and it may therefore be expedient for the correction to introduce impact forces into transition radii 8 of these sectors or into transition radii 8 that adjoin these sectors $S_3$, $S_4$, $S_5$, $S_6$. The impact forces provided according to the invention may also advantageously be introduced into transition radii which are situated in sectors (or adjoin these sectors) which cause the concentricity errors.

The defined transition radii 8 may basically also be determined on the basis of simulations, calculations and/or series of tests of a respective crankshaft type.

In particular if only one impact device 1 and/or one impact tool 16 is to be used, it may be advantageous to select only transition radii 8 either between connecting-rod bearing journals 5 and crank webs 7 or between main bearing journals 6 and crank webs 7 as defined transition radii 8. In this case, a conversion or adjustment of the apparatus during the method can be omitted, and the processing speed can thus be maximized.

It is preferable for only transition radii 8 between main-bearing journals 6 and crank webs 7 to be selected as defined transition radii 8.

Provision may also be made for at least two impact tools 16 to be used, and for at least one transition radius 8 between one of the connecting-rod bearing journals 5 and one of the adjoining crank webs 7 and at least one transition radius 8 between one of the main bearing journals 6 and one of the adjoining crank webs 7 to be selected as defined transition radii 8.

Provision may particularly preferably be made whereby the at least one impact tool 16 introduces the impact force $F_S$ for the correction of the concentricity errors and/or of the length deviation into highly loaded regions of the defined transition radii 8.

Figure 9:
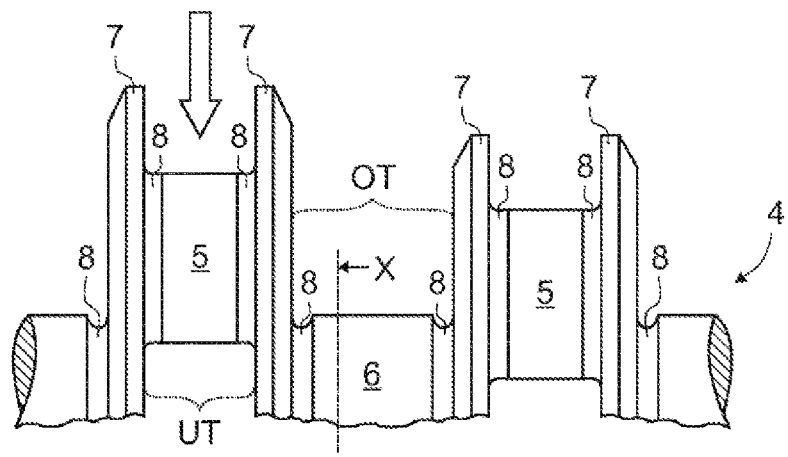

FIG. 9 illustrates an exemplary detail of a crankshaft 4 with respective transition radii 8 between connecting-rod bearing journals 5 and crank webs 7 and between main bearing journals 6 and crank webs 7.

Depending on the engine operation or purpose of the crankshaft 4, the transition radii 8 respectively adjoining the journals 5, 6 may have highly loaded regions $B_{MAX}$ that are situated in each case at different positions. An exemplary loading of the crankshaft 4 is illustrated in FIG. 9 by means of an arrow. The connecting-rod bearing journal 5 is connected along the arrow via a piston (not illustrated) to the engine. That side of the connecting-rod bearing journal 5 to which the arrow points is in this case the so-called pressure side. The so-called bottom dead center BDC of the connecting-rod bearing journal 5 is situated at the side opposite the pressure side, specifically the tension side. From experience, the bending loading of the respective transition radii 8 is at its greatest at the bottom dead center BDC of the connecting-rod bearing journal 5. It is advantageously possible for the highly loaded region $B_{MAX}$ to be defined as adjoining, preferably symmetrically surrounding, the bottom dead center BDC.

In the case of the crankshaft 4 illustrated in FIG. 9, it is furthermore possible for a most highly loaded point of the main bearing journal 6 adjoining the connecting-rod bearing journal 5 to be a region which corresponds to the pressure side of the adjoining connecting-rod bearing journal 5. For simplicity, said region of a main bearing journal 6 will hereinafter be referred to as "top dead center" TDC.

Provision may thus in particular be made whereby, for the introduction of the impact force $F_S$ for the correction of the concentricity errors and/or length deviation into at least one of the transition radii 8 along the respective transition radius 8 running in annularly encircling fashion (around the connecting-rod bearing journal 5 and/or main bearing journal 6), a highly loaded region $B_{MAX}$, a lightly loaded region $B_{MIN}$ and interposed intermediate regions $B_{ZW}$ are defined, following which impact hardening is performed such that the impact force $F_S$ introduced into the intermediate regions $B_{ZW}$ is increased in the direction of the highly loaded region $B_{MAX}$.

Here, provision may be made whereby the impact force $F_S$ that is introduced into the highly loaded region $B_{MAX}$ is determined on the basis of the desired fatigue strength of the crankshaft 4 and/or the desired fatigue strength of portions of the crankshaft 4.

Figure 10:
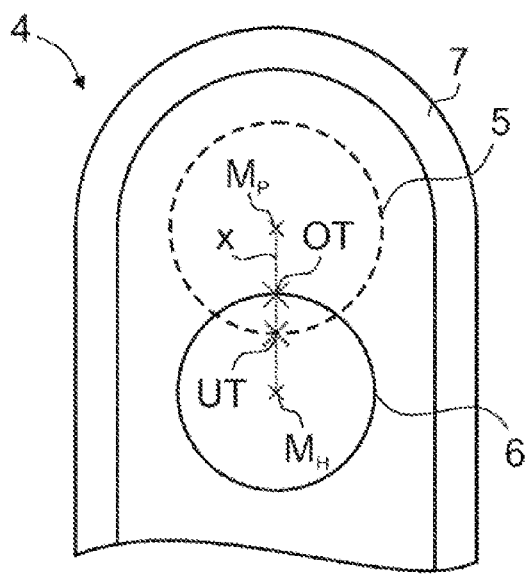

For improved illustration of the positions of the dead centers BDC and TDC, FIG. 10 shows a diagrammatic section through the crankshaft 4 along the illustrated section line "X" in FIG. 9.

It can be seen here that the most highly loaded point or the top dead center TDC of a transition radius 8 of a main bearing journal 6 lies, in the cross section of the crankshaft 4, at the point of intersection of the transition radius 8 of the main bearing journal 6 with the connecting line x of the central points $M_H$, $M_P$ of the main bearing journal 6 and of the connecting-rod bearing journal 5 adjoining the transition radius 8 of the main bearing journal 6.

FIG. 11 shows a section through an exemplary journal 5, 6 for the purposes of illustrating the possible distribution of the regions $B_{MAX}$, $B_{MIN}$, $B_{ZW}$ along the circumference of the journal 5, 6.

In the present case, the most highly loaded point of the journal 5, 6, that is to say the bottom dead center BDC of a connecting-rod bearing journal 5 or the top dead center TDC of a main bearing journal 6, is denoted by 180°. Proceeding from this point, the highly loaded region $B_{MAX}$ is defined along the transition radius 8 running in annularly encircling fashion around the crankshaft 4. The highly loaded region $B_{MAX}$ may amount to at least ±20°, preferably at least ±30°, more preferably at least ±40°, particularly preferably at least ±50°, very particularly preferably at least ±60°, for example at least ±70°, at least ±80° or at least ±90° proceeding from this point, preferably symmetrically.

Adjoining the highly loaded region $B_{MAX}$, there are defined two intermediate regions $B_{ZW}$ which separate the highly loaded region $B_{MAX}$ from the lightly loaded region $B_{MIN}$. The intermediate regions $B_{ZW}$ may encompass any angle segment along the annularly encircling transition radius 8. The same applies to the lightly loaded region $B_{MIN}$. The respective angle ranges may be determined by calculations, simulation and/or test series, possibly also from measurements during real-time operation (of the engine).

The impact force $F_S$ introduced into the intermediate regions $B_{ZW}$ is preferably increased (preferably steadily) in the direction of the highly loaded region $B_{MAX}$. The statement that the impact force $F_S$ is increased means that the impact force $F_S$ is preferably progressively increased between successive impacts.

FIGS. 12 to 15 illustrate four exemplary profiles of the impact force $F_S$ along the circumference of a journal 5, 6, for example of the journal 5, 6 from FIG. 11.

Here, in FIGS. 12, 14 and 15, the impact force $F_S$ that is introduced into the respective highly loaded region $B_{MAX}$ is constant.

In all of the curves illustrated by way of example, the impact force $F_S$ introduced into the highly loaded regions $B_{MAX}$ is greater than or at least equal to the respective maximum impact force $F_S$ that is introduced into the intermediate regions $B_{ZW}$ (and self-evidently in each case greater than the impact force $F_S$ that is introduced into the lightly loaded region $B_{MIN}$).

The maximum impact force $F_{MAX}$ is thus introduced in the highly loaded region $B_{MAX}$ of the transition radius 8.

Furthermore, FIGS. 12 and 15 show an exemplary force distribution in which, in each case, no impact force $F_S$ is introduced into the lightly loaded region $B_{MIN}$. By contrast, in FIGS. 13 and 14, in the in each case lightly loaded region $B_{MIN}$, an impact force $F_S$ is introduced which is lower than the lowest impact force $F_S$ that is introduced into the intermediate regions $B_{ZW}$. Here, in the case of FIG. 14, a minimum impact force $F_{min}$ is provided, which is kept constant in the lightly loaded region $B_{MIN}$. By contrast, in FIG. 13, proceeding from the intermediate regions $B_{ZW}$ to the position situated opposite the most highly loaded point or the bottom dead center BDC or the top dead center TDC respectively, the impact force $F_S$ is reduced in steadily linear fashion to a minimum value, in the present case 0.

In FIG. 12, proceeding from the lightly loaded region $B_{MIN}$, in which for example no impact force is introduced in the present case, the impact force $F_S$ introduced into the intermediate regions $B_{ZW}$ is increased uniformly and/or linearly to the highly loaded region $B_{MAX}$. By contrast, in FIG. 13, the profile of the impact force $F_S$ follows a continuous ramp which, proceeding from a point situated opposite the most highly loaded point or the bottom dead center BDC or the top dead center TDC along the circumference of the crankshaft 4, increases in each case in the direction of the most highly loaded point or the bottom dead center BDC or the top dead center TDC respectively. Here, in the respective regions $B_{MIN}$, $B_{ZW}$ and $B_{MAX}$, the profile of the impact force $F_S$ follows a respectively associated ramp function, which collectively form the ramp illustrated.

FIG. 14 illustrates a profile of the impact force $F_S$ which is basically similar to the profile of the impact force $F_S$ of FIG. 12. In the intermediate regions $B_{ZW}$, however, by contrast to the linear or ramp-shaped variation of the impact force $F_S$ illustrated in FIG. 12, a smoothed curve profile is illustrated.

Basically, FIG. 15 shows a diagram in which the impact forces $F_S$ are varied in the intermediate regions $B_{ZW}$ in steps.

Finally, any variations and combinations, in particular (but not exclusively) of the profiles illustrated in FIGS. 12 to 15, may be provided. The invention is not restricted to a particular profile of the impact force $F_S$. A profile of the impact force $F_S$ along the circumference of the annularly encircling transition radius 8 may also be selected with regard to the engine operation or the purpose of the crankshaft 4.

What is claimed is:

1. A method for the post-processing of a crankshaft for the purposes of correcting concentricity errors and/or for the purposes of length correction, the method comprising the following steps:
   determining concentricity errors for sectors of the crankshaft and/or determining a length deviation from a setpoint length for at least one portion of the crankshaft;
   introducing an impact force for correcting the concentricity errors and/or the length deviation into at least one defined transition radius between connecting-rod bearing journals and crank webs and/or between main bearing journals and the crank webs of the crankshaft by means of at least one impact tool; and
   hardening the transition radii of the crankshaft prior to the determination of the concentricity errors and/or the determination of the length deviation, wherein the portion of the crankshaft in which the length deviation from the setpoint length is determined corresponds to a spacing between two crank webs.

2. The method as claimed in claim 1, wherein the at least one impact tool introduces an impact force for correcting the concentricity errors and/or the length deviation into highly loaded regions of the defined transition radii.

3. The method as claimed in claim 1, wherein the only transition radii situated in the sectors which cause the concentricity errors are selected as defined transition radii.

4. The method as claimed in claim 1, wherein, for the correction of the length deviations, an impact force is introduced into all transition radii of the crankshaft by means of the at least one impact tool.

5. The method as claimed in claim 1, wherein the nature of the concentricity error is determined based on whether a concentricity error in the end sections of the crankshaft is present, wherein the defined transition radii are selected on the basis of the nature of the concentricity error.

6. The method as claimed in claim 1, wherein the defined transition radii are determined on the basis of simulations of a respective crankshaft type.

7. The method as claimed in claim 1, wherein, for at least one further shape and/or position specification, a deviation from a nominal dimension is determined, following which an impact force for correcting the at least one further deviation is introduced into at least one defined transition radius between one of the connecting-rod bearing journals and one of the crank webs and/or between one of the main bearing journals and one of the crank webs of the crankshaft by means of the at least one impact tool.

8. The method as claimed in claim 1, wherein only transition radii either between the connecting-rod bearing journals and the crank webs or between the main bearing journals and the crank webs are selected as defined transition radii.

9. The method as claimed in claim 1, wherein at least two impact tools are used and at least one transition radius between one of the connecting-rod bearing journals and one of the adjoining crank webs and at least one transition radius between one of the main bearing journals and one of the adjoining crank webs are selected as defined transition radii.

10. The method as claimed in claim 1, wherein, for the introduction of the impact force into at least one of the transition radii along the respective transition radius running in annularly encircling fashion around the crankshaft, a highly loaded region, a lightly loaded region and interposed intermediate regions are defined, following which impact hardening is performed such that the impact force introduced into the intermediate regions is increased in the direction of the highly loaded region.

11. The method as claimed in claim 1, wherein the only transition radii situated in the at least one portion that has the length deviations are selected as defined transition radii.

12. The method as claimed in claim 1, wherein the nature of the concentricity error is determined based on whether an arcuate runout of the crankshaft is present, wherein the defined transition radii are selected on the basis of the nature of the concentricity error.

13. The method as claimed in claim 1, wherein the nature of the concentricity error is determined based on whether a zigzag runout of the crankshaft is present, wherein the defined transition radii are selected on the basis of the nature of the concentricity error.

14. The method as claimed in claim 1, wherein the defined transition radii are determined on the basis of calculations of a respective crankshaft type.

15. The method as claimed in claim 1, wherein the defined transition radii are determined on the basis of series of tests of a respective crankshaft type.

16. A method for the post-processing of a crankshaft for the purposes of correcting concentricity errors and/or for the purposes of length correction, the method comprising the following steps:

determining concentricity errors for sectors of the crankshaft and/or determining a length deviation from a setpoint length for at least one portion of the crankshaft;

introducing an impact force for correcting the concentricity errors and/or the length deviation into at least one defined transition radius between connecting-rod bearing journals and crank webs and/or between main bearing journals and the crank webs of the crankshaft by means of at least one impact tool; and hardening the transition radii of the crankshaft prior to the determination of the concentricity errors and/or the determination of the length deviation, wherein the portion of the crankshaft in which the length deviation from the setpoint length is determined corresponds to a partial length of the crankshaft.

17. A method for the post-processing of a crankshaft for the purposes of correcting concentricity errors and/or for the purposes of length correction, the method comprising the following steps:

determining concentricity errors for sectors of the crankshaft and/or determining a length deviation from a setpoint length for at least one portion of the crankshaft;

introducing an impact force for correcting the concentricity errors and/or the length deviation into at least one defined transition radius between connecting-rod bearing journals and crank webs and/or between main bearing journals and the crank webs of the crankshaft by means of at least one impact tool; and hardening the transition radii of the crankshaft prior to the determination of the concentricity errors and/or the determination of the length deviation, wherein the portion of the crankshaft in which the length deviation from the setpoint length is determined corresponds to an entire length of the crankshaft.

\* \* \* \* \*